L. B. LENT.
AUTOMOBILE FIRE ENGINE.
APPLICATION FILED MAR. 18, 1911.

1,010,158.

Patented Nov. 28, 1911.
3 SHEETS—SHEET 1.

Witnesses
J. Milton Jester
E. G. McCarthy

Inventor
Leon B. Lent

By
B. T. Foster
Attorney

L. B. LENT.
AUTOMOBILE FIRE ENGINE.
APPLICATION FILED MAR. 18, 1911.

1,010,158.

Patented Nov. 28, 1911.
3 SHEETS—SHEET 2.

L. B. LENT.
AUTOMOBILE FIRE ENGINE.
APPLICATION FILED MAR. 18, 1911.

1,010,158.

Patented Nov. 28, 1911.
3 SHEETS—SHEET 3.

Witnesses
J. Milton Jester
E. G. McCarthy

Inventor
Leon B. Lent
By B. F. Foster
Attorney

UNITED STATES PATENT OFFICE.

LEON B. LENT, OF BREWSTER, NEW YORK.

AUTOMOBILE FIRE-ENGINE.

1,010,158.  Specification of Letters Patent.  Patented Nov. 28, 1911.

Application filed March 18, 1911. Serial No. 615,266.

*To all whom it may concern:*

Be it known that I, LEON B. LENT, a citizen of the United States, residing at Brewster, in the county of Putnam and State of New York, have invented new and useful Improvements in Automobile Fire-Engines, of which the following is a specification.

The present invention relates to self-propelled fire engines, the primary object of which is to provide a simple, efficient and compact apparatus. These objects are partly secured by using the impeller or impellers of the pump as flywheels of the motor and also by utilizing the pump shaft as part of the driving shaft of the vehicle.

A simple embodiment of the invention is illustrated in the accompanying drawings, wherein:—

Figure 1:
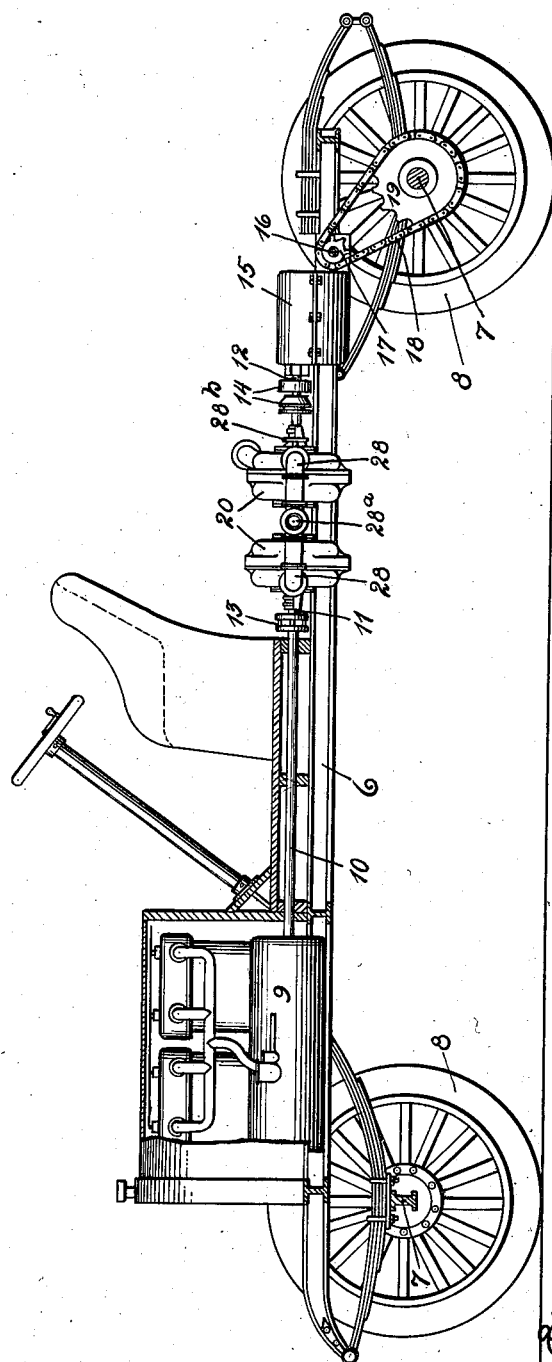
Figure 2:
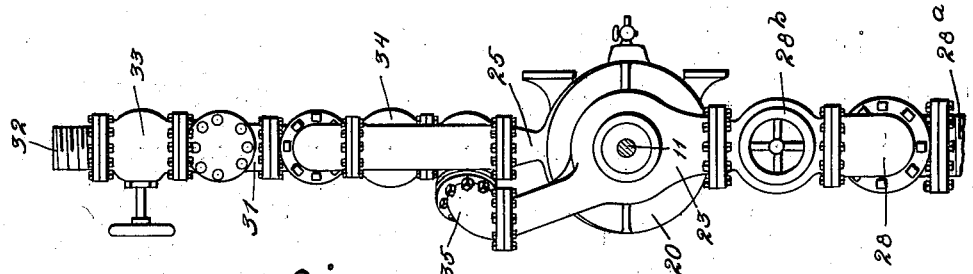
Figure 3:
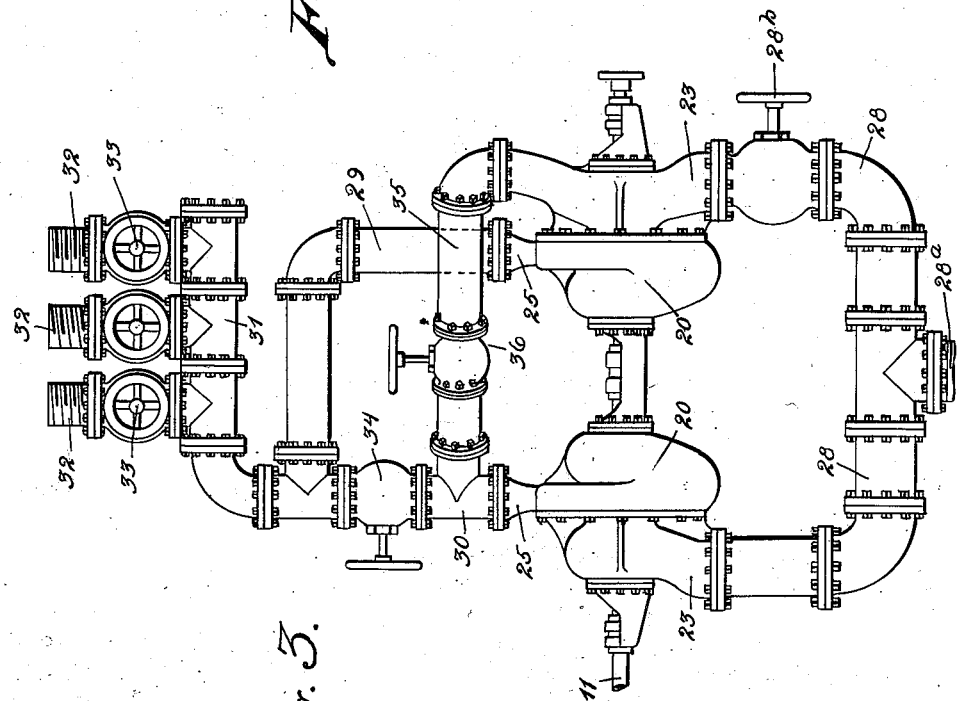
Figure 4:
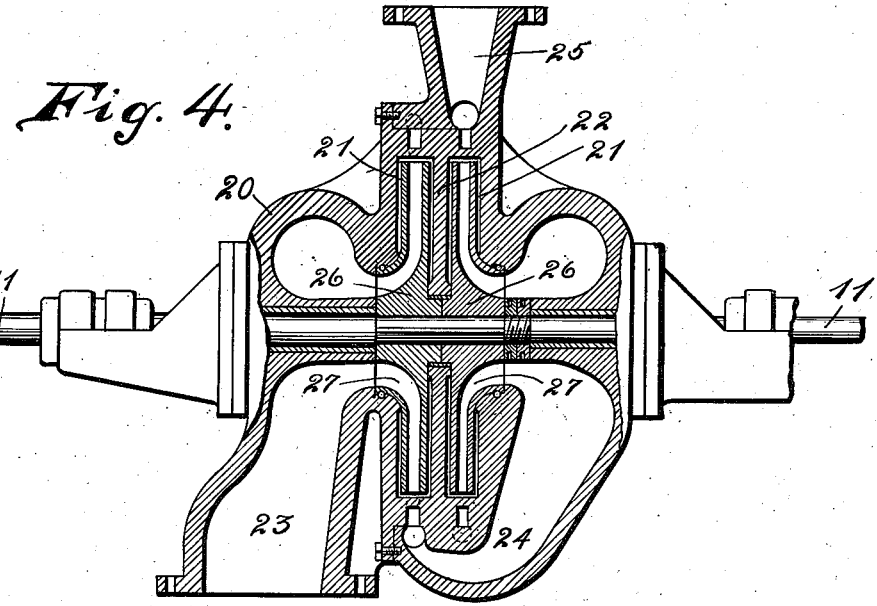
Figure 5:
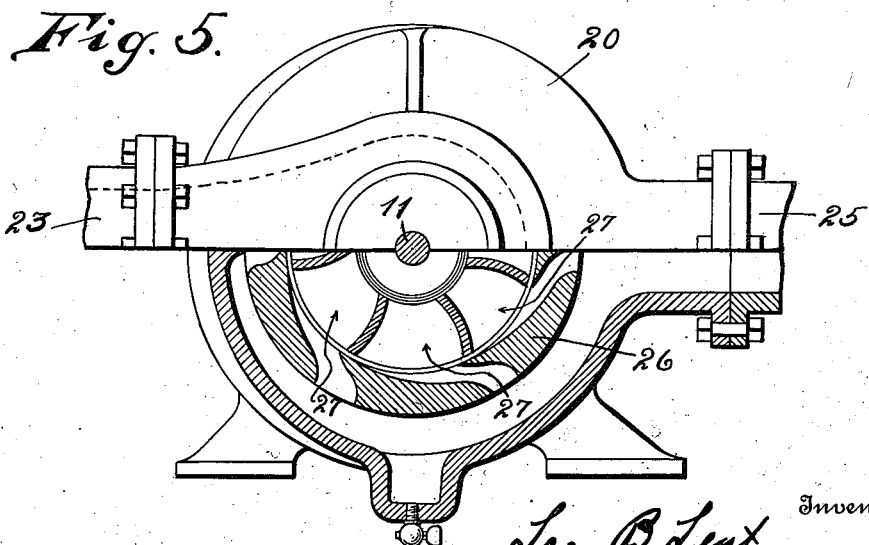

Figure 1 is a sectional view through a fire engine, constructed in accordance with the present invention. Fig. 2 is a rear elevation on an enlarged scale of the pump mechanism. Fig. 3 is a plan view of the same. Fig. 4 is a longitudinal sectional view through one of the pumps, a two stage pump being chosen arbitrarily for illustration. Fig. 5 is a view partly in elevation and partly in section thereof.

Similar reference numerals designate corresponding parts in all the figures of the drawings.

In Fig. 1 is shown in outline, an automobile or self-propelled fire engine, with various parts, unnecessary to an understanding of the invention, eliminated. A suitable frame 6 is mounted on front and rear axles 7 that carry suitable supporting wheels 8. A motor 9, preferably of the internal combustion type, is mounted on the front portion of the frame, with a shaft extending from the motor; which shaft may be in one piece, but preferably comprising sections 10, 11 and 12. The section 10 may be connected to the section 11 by a flexible coupling 13, and the section 11 can be connected to and disconnected from the section 12 through the medium of a suitable clutch 14. The section 12, in turn, is connected to the usual transmission change gear mechanism that is arranged in a case 15, and this mechanism operates either the usual direct drive or preferably a countershaft 16 carrying sprocket wheels 17. The sprocket wheels are engaged by chains 18 that operate on other sprocket wheels 19 carried by the rear or driving wheels 8 of the vehicle.

The section 11, besides constituting a part of the driving shaft between the motor and the transmission gear, is also the pump shaft, passing through one or more pump casings, two being shown, and designated 20. These casings each constitute a part of a centrifugal or turbine pump of the single or multi-stage type. Each of said casings in the two-stage pump shown, has a pair of impeller chambers 21 divided by an intermediate partition 22. An inlet 23 in the casing 20 leads to one of the chambers, and from said chamber, a passageway 24 leads to the inlet of the other chamber, as illustrated in Fig. 4. Said other chamber is provided with a suitable discharge 25. The shaft section 11 passes axially through these chambers with a pair of impellers 26 fixed thereto that operate in their respective chambers. These impellers have passages 27 communicating with the inlets of the chambers and opening through their peripheries. In a pump of this type there is at least one impeller for each stage and it is to be noted by reference to Fig. 4 that the said impellers are permanently affixed to the shaft 11, and consequently whenever the motor is in operation, they will be revolving and will act as flywheels of the motor.

Since the vehicle is driven through the pump shaft, the said shaft becomes a part of the driving train for propelling the vehicle when said vehicle is in motion. It is therefore apparent that the impellers are an essential part of the pump and also of the motor; and further that the pump shaft is an essential part of both the pump and the propelling mechanism of the vehicle.

In one preferred form of construction, two pumps are employed with their inlets connected, as shown at 28, to a common supply nipple 28[a]. In the connection 28, leading to one pump is placed a suitable valve 28[b]. The pump discharges are connected, as shown at 29 and 30, to a common outlet pipe 31 having one or more discharge nipples 32, which, in case of more than one, are controlled by valves 33. A valve 34 is placed in the discharge 30, and a return pipe 35 having a valve 36 therein leads from the discharge 30 of one of the pumps to the inlet end of the other. With this arrangement, the pumps can be worked in series or in parallel. For example, if the pumps are to be operated in parallel, the valves 34 and 28[b] are opened and the valve 36 is closed, whereupon the pumps will discharge through the connections 29 and 30 into the common outlet 31. If, however, they are to be run in series, the valves 34 and 28ᵇ are closed, and the valve 36 is opened. The water will then pass from the left hand pump, through the return 35 to the right hand pump, and then through the discharges 29 and 31 at a greater pressure than when the pumps are run in parallel, but with a correspondingly less amount of flow.

From the foregoing, it is thought that the construction, operation and many advantages of the herein described invention will be apparent to those skilled in the art, and it will be understood that various changes in the arrangement, size, shape, proportion and minor details of construction may be resorted to without departing from the spirit or sacrificing any of the advantages of the invention.

Having thus fully described my invention, what I claim as new, and desire to secure by Letters Patent, is:—

1. In an automobile fire engine, the combination with a frame and supporting wheels, of a motor, a main shaft driven thereby, transmission mechanism between the shaft and wheels, and a pump directly driven by said shaft.

2. In an automobile fire engine, the combination with a frame and supporting wheels, of a motor, a main shaft driven thereby, transmission mechanism between the shaft and wheels, and a rotary pump driven directly from said shaft.

3. In an automobile fire engine, the combination with a frame and supporting wheels, of a motor, a main shaft driven thereby, transmission mechanism between the shaft and wheels, a rotary pump containing an impeller permanently fastened to said shaft.

4. In an automobile fire engine, the combination with a frame and supporting wheels, of a motor mounted on the front end of the frame, a main shaft driven by the motor and extending longitudinally of the frame, transmission mechanism between the shaft and the wheels, and a rotary pump whose impeller is permanently mounted on said shaft, said impeller constituting a flywheel for the motor.

5. In an automobile fire engine, the combination with a frame and supporting wheels, of a motor mounted on the front end of the frame, a main shaft driven by the motor and extending longitudinally of the frame, transmission mechanism between the shaft and the wheels, and a rotary pump whose impeller is permanently mounted on said shaft, said impeller constituting a flywheel for the motor, and said shaft comprising both a pump shaft and a vehicle propeller shaft.

6. In an automobile fire engine, the combination with a frame and supporting wheels, of a motor mounted on the forward end of the frame, a longitudinal drive shaft driven by the motor, transmission mechanism connecting the rear wheels, a plurality of pumps surrounding the driving shaft, and impellers permanently fixed to the shaft, said impellers constituting flywheels for the motor; and said shaft comprising both a pump shaft and a vehicle propelling shaft; supply conduits for the pumps, discharge conduits for the pumps, and means for changing the flow and running the pumps either in parallel or in series.

7. In an automobile fire engine, the combination with a frame and supporting wheels, of a motor, a main shaft driven thereby and comprising a plurality of sections, the first section being connected to the motor, a pump permanently mounted on the second section, and transmission mechanism connected to the third section, a coupling between the first and second sections, and a clutch connection between the second and third sections.

In testimony whereof I have hereunto set my hand in presence of two subscribing witnesses.

LEON B. LENT.

Witnesses:
MARTIN M. TINSLEY,
FRANKLIN ACKER.